United States Patent [19]

Yamada et al.

[11] 3,866,182

[45] Feb. 11, 1975

[54] SYSTEM FOR TRANSFERRING INFORMATION BETWEEN MEMORY BANKS

[75] Inventors: Hiroshi Yamada; Yoshiro Yoshioka, both of Tokyo, Japan

[73] Assignee: Fujitsu Limited, Kawasaki, Japan

[22] Filed: July 18, 1973

[21] Appl. No.: 380,160

Related U.S. Application Data

[63] Continuation-in-part of Ser. No. 866,567, Oct. 15, 1969, abandoned.

[30] Foreign Application Priority Data

Oct. 17, 1968 Japan .............................. 43-75984

[52] U.S. Cl. .............................................. 340/172.5

[51] Int. Cl. .............................................. G06f 13/00

[58] Field of Search .................................. 340/172.5

[56] References Cited

UNITED STATES PATENTS

| | | | |
|---|---|---|---|
| 3,312,947 | 4/1967 | Raspanti | 340/172.5 |
| 3,386,082 | 5/1968 | Stafford et al. | 340/172.5 |
| 3,517,171 | 6/1970 | Avizienis | 340/172.5 |
| 3,533,082 | 10/1970 | Schnabel et. al. | 340/172.5 |
| R26,624 | 7/1969 | Bloom et al. | 340/172.5 |

*Primary Examiner*—Harvey E. Springborn
*Attorney, Agent, or Firm*—Herbert L. Lerner

[57] ABSTRACT

A system for transferring information between a plurality of memory banks in which there are provided a plurality of memory banks each having the same performance and capacity. At least one of the memory banks serves as an operating memory bank while at least one of the other memory banks serves as a standby. Processing circuit means including a central processing unit and a data channel unit are provided to utilize the contents of the memory banks, and a memory control means controls the transfer of data to be processed from the memory banks to the utilizing circuit means. A memory to memory transfer circuit means is operable to transfer all of the information from the operating memory bank to the standby memory bank in a manner which prevents loss of information during the switching of the memory banks, whereby the standby memory bank then becomes the operating memory bank.

4 Claims, 6 Drawing Figures

SYSTEM FOR TRANSFERRING INFORMATION BETWEEN MEMORY BANKS

Figure 1:
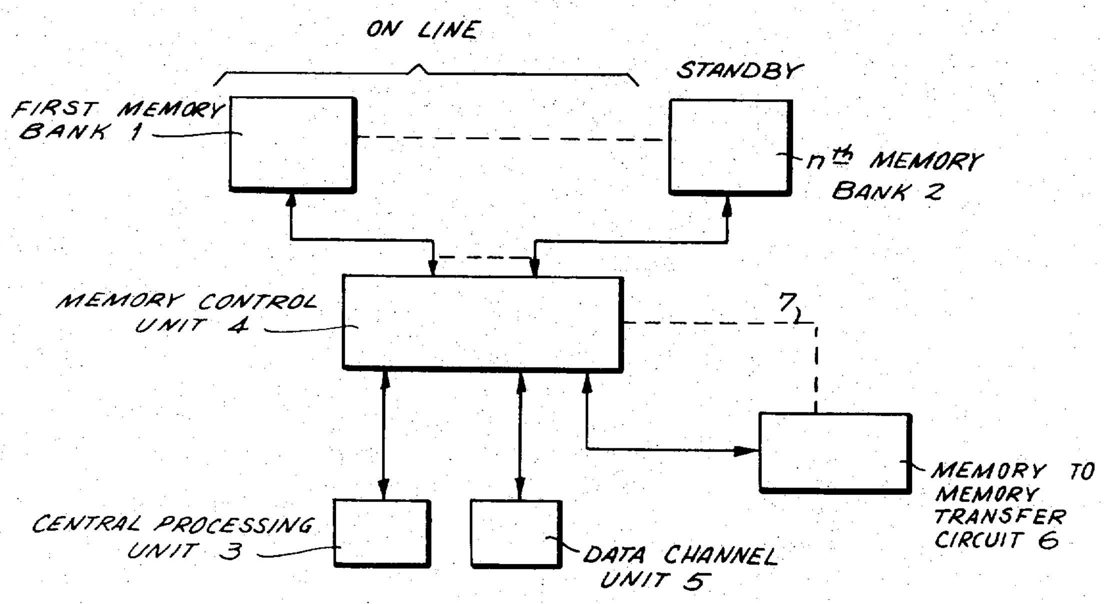

This is a continuation-in-part of application Ser. No. 866,567, filed Oct. 15, 1969, and now abandoned.

The invention relates to a data processing system.

The data processing system of the invention comprises a plurality of memory components, devices, circuits or banks, which function as main or principal memories each of which includes individual address selecting circuits. Usually, principal or main memories are core memories.

The principal object of the invention is to provide a new and improved data processing system having a simple structure and operating with great efficiency, effectiveness and reliability, which prevents errors which may occur during operation and which prevents the occurrence of interruptions in operation or data transfer.

An object of the invention is to provide a data processing system which continues the transfer of data even when data is being transferred from one to another of a plurality of memory banks, in which data is transferred to a standby memory bank and in which the channel components utilize a single time slot in the memory cycle.

In a known data processing system, the main memory units are checked by known processes such as the single error correction process and the double error detection process. These processes are applied to a plurality of banks of a main memory unit, which banks are memory banks and may comprise core memories, or the like. A single error is automatically corrected by an error correcting code. If a single error occurs, the error is corrected and the memory bank is switched to a standby bank. Switching to a standby memory bank is effected by the switching address, only after the complete contents of the memory bank in which the error occurred are transferred to the standby bank. During transfer to the standby bank, the data processing operation within the central processor or utility devices such as, for example, the data channel device, and so on, which utilize the contents of the memory bank, are temporarily halted.

Our invention was developed to prevent such temporary halts, thereby enabling the data processing operation to continue normally even when the data in the transferring memory bank is being transferred to the standby memory bank. This results in a significant increase in the total efficiency of the data processing equipment.

In accordance with the invention, a data processing system comprises a plurality of memory banks. A utilizing circuit utilizes the contents of the memory banks. A memory control circuit connected to each of the memory banks selectively transfers the contents of an arbitrary first of the memory banks to a selected second of the memory banks and selectively switches the first of the memory banks to the second of the memory banks in a manner whereby, if the utilizing circuit utilizes the first memory bank in a manner whereby the contents of the first memory bank are written into the utilizing circuit while the contents are being transferred to a selected one of the memory banks, the contents are also written into the second memory bank thereby preventing a possible loss of information during the switching of the memory banks.

The data processing system of our invention immediately detects an error in an on-line memory bank and transfers all the data stored in the on-line memory bank to a standby memory bank.

The data processing system of our invention corrects data errors by utilizing error correction codes with regard to the word composition of data stored in the main memories. Thus, for example, if an error or fault occurs in a transferring memory bank and results in an error in part of the stored data, the erroneous data will be effectively corrected, since the data word composition of said data corresponds to the error correcting codes. Each of the memory banks has a separate address selecting circuit.

Figure 3:
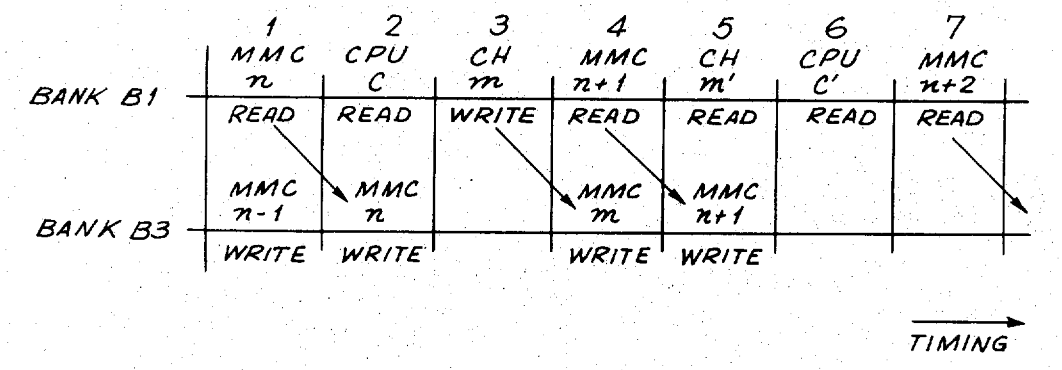

In order that the invention may be readily carried into effect, it will now be described with reference to the accompanying drawings, wherein:

FIG. 1 is a block diagram of an embodiment of the data processing system of our invention;

FIGS. *2a*, *2b*, *2c* and *2d*, which together are a single FIG., constitute a circuit diagram of an embodiment of the data processing system of the present invention; and FIG. 3 is a graphical illustration for explaining the operation of the data processing system of our invention.

The data processing system of FIG. 1 comprises a plurality of memory banks or data storage banks. Of the plurality of memory banks, two are shown in FIG. 1. The two banks 1 and 2 represent the first and $n^{th}$ memory bank and each is a large capacity bank. The remaining memory banks are not shown in FIG. 1 in order to maintain the clarity of illustration. The data to be processed is extracted from the memory bank and is transferred to a central processing unit 3 under the control of a memory control unit 4. The data is processed by the arithmetic circuit of the central processing unit 3 and is then rewritten in the memory bank.

The data processing system is also provided with a plurality of additional components, besides the memory banks and the central processing unit 3. Included in these additional components are magnetic tape handlers, tape readying devices, input-output devices as represented by a character display unit, and so on. The input-output devices are also included in the components which operate around the memory banks. That is, the data to be written into the magnetic tape handler are read out from each corresponding memory bank and transferred to the buffer memory of said tape handler, the data read out from the tape handler are similarly transferred to each corresponding memory bank and are written into such banks.

A data channel unit 5 is provided for the handling of data to input-output devices. The data channel unit 5 and the central processing unit 3 are also known as utilizing circuits, since they utilize the data stored in the main memory. In modern data processing systems the main memories are designed to store large quantities of data, and efforts have been made to increase the overall processing efficiency of the data processing system by utilizing the memories to the greatest possible extent. The relatively expensive main memories must be utililzed to the limit of their capacity.

The time division system is the result of one of the efforts made to utilize the memories to the greatest possible extent. The time division system was designed to simultaneously utilize the central processing unit 3 and the data channel unit 5 by separately distinctly assigning the available time of said central processing unit and said data channel unit to the cycle time or time slot of the process or operation. In other words, the time division system was designed to timely switch the cycle time of the memory, or the memory cycle.

Figure 2A:
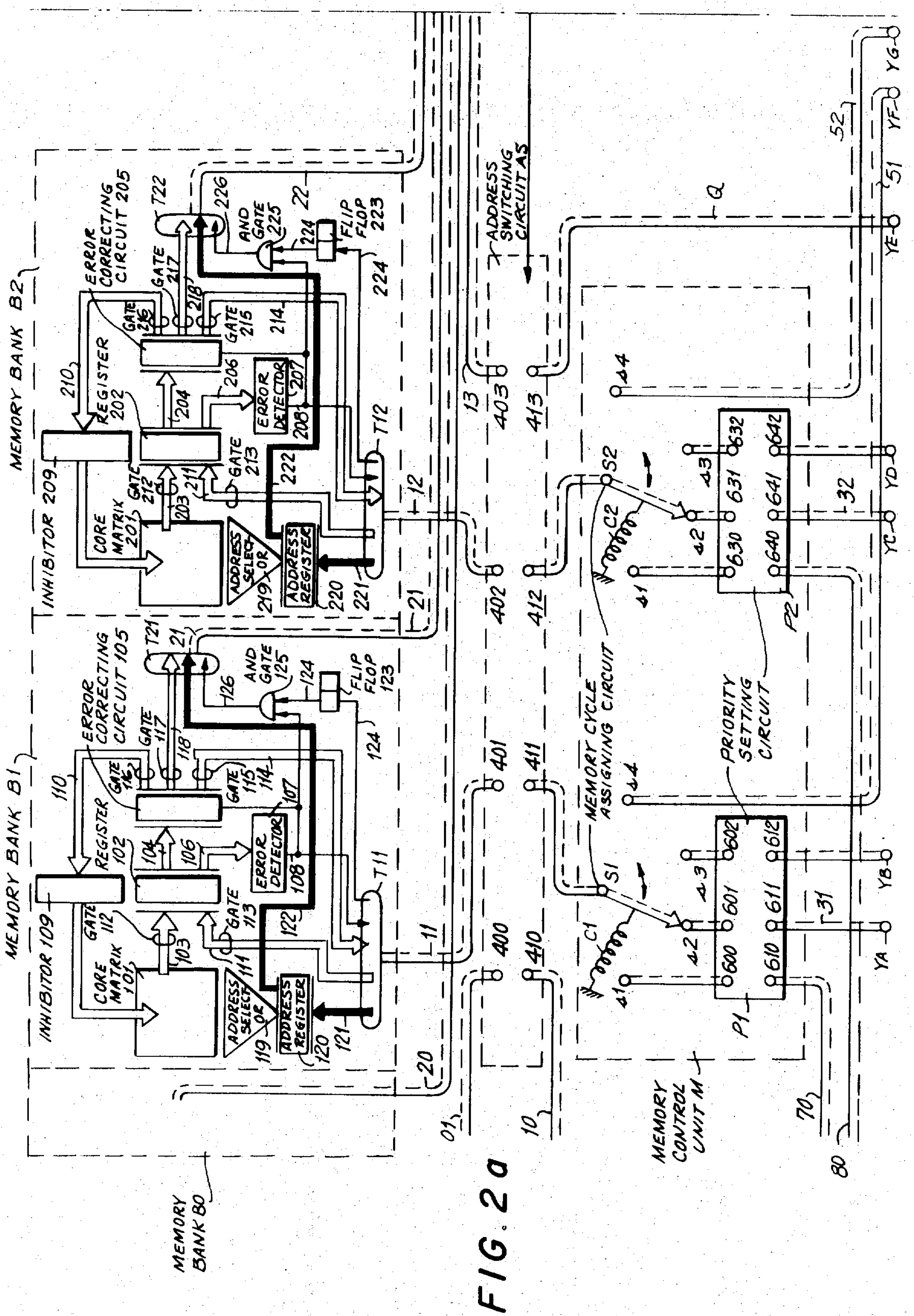
Figure 2B:
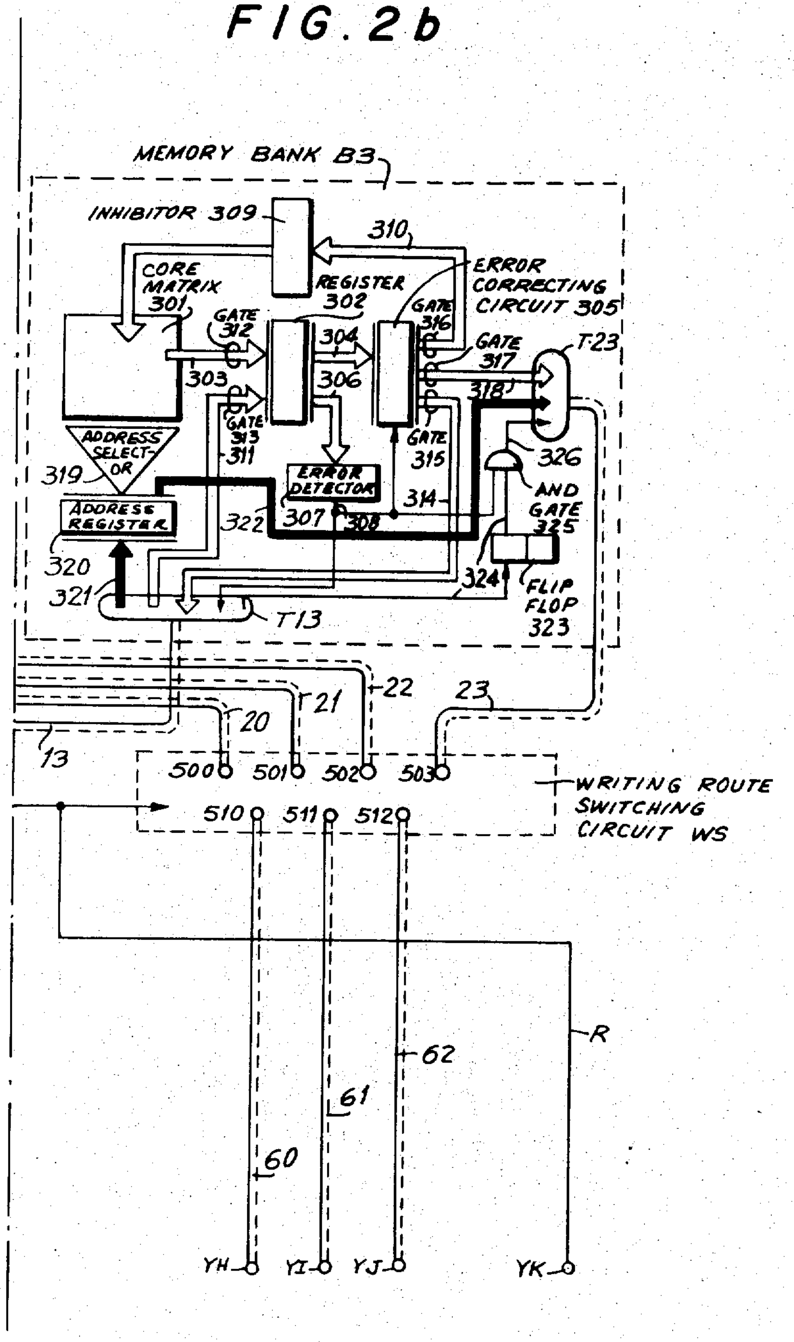

When a time is assigned, a priority is determined between the central processing unit 3 and the data channel unit 5. The memory control unit 4 provides this function. As hereinbefore described, in a modern data processing system, which utilizes a main memory, the overall reliability depends upon said memory as a vital component or element. If the memory has a malfunction or error, the entire data processing system will be halted in operation at the instant of the malfunction, fault or error, and the process or operation will be completely disrupted. In our data processing system this is prevented by three components. The three components comprise a memory to memory transfer circuit 6, as shown in FIG. 1, an address switching circuit AS, as shown in FIG. 2*a*, and a writing route switching circuit WS, as shown in FIG. 2*b*. The memory to memory transfer or shifting circuit 6 may be referred to as MMC, the central processing unit 3 may be referred to as CPU and the data channel unit may be referred to as DCH. The memory to memory transfer circuit 6 functions to transfer all the information from the operating memory banks to the standby memory banks, as required in our data processing system.

The memory to memory transfer circuit 6 is connected to the memory control unit 4 and, via said memory control unit, to the central processing unit 3 and the data channel unit 5. The central processing unit 3 and the data channel unit 5 may therefore be operated simultaneously with the memory to memory transfer circuit 6. In other words, the central processing unit 3, the data channel unit 5 and the memory to memory transfer circuit 6 may separately utilize the memory cycles at all times with regard to the memory banks, and under the control of the memory control unit 4.

While the memory to memory transfer circuit 6 is in operation, that is, during the time that data is being transferred from the active or transferring memories to the standby memories, there is an important consideration. The central processing unit 3 or the data channel unit 5 is required to obtain access to the memory area in which the data transfer operation is completed. At such time, the contents of the transferring memory have been transferred to the standby memory bank, so that some action must be taken to prevent the correction information from being lost. The transferred contents of the standby memory banks must be replaced by new information which is supplied during the transfer process or operation.

There is a requirement that the address or addresses about to be transferred be corrected by the central processing unit 3 or the data channel unit 5. In such case, the address or addresses of the standby memory bank or banks may be written in with the information transferred directly through the central processing unit 3 or the data channel unit 5 which have requested the renewal of the information, instead of the memory to memory transfer circuit 6.

The transfer operation, from the transferring memory bank to the standby memory bank, is as follows. If a single error is detected in the memory bank 1, an error detection signal is produced and transmitted to the central processing unit 3. The error detection signal is an interrupting signal which, when received by the central processing unit 3, interrupts the program then in execution. When the program is interrupted, it is replaced by a program for processing or correcting the error.

The program for processing the error includes an instruction or command to activate the memory to memory transfer circuit 6. That is, the central processing unit 3 instructs the memory to memory transfer circuit 6 to transfer the contents of the memory bank 1 to the standby memory bank 2. Upon completion of the error process program, the error detection signal is terminated and the interrupted program is resumed. Transfer of data continues for a period of time, in parallel with the operation of the central processing unit 3.

The memory to memory transfer circuit 6 transfers the data or information in the following sequence. The memory to memory transfer circuit 6 first sets an initiation address in the memory bank 1. The memory to memory transfer circuit 6 then reads out the desired information from the memory bank 1, based upon the initiation address. The transfer circuit 6 then writes the data or information into the address of the standby memory bank 2. The transfer circuit 6 renews the address upon completion of the write-in of the data. The read-out and write-in processes are then repeated until the maximum capacity of the memory bank 2 is utilized.

The writing of the data into the address of the $n^{th}$ memory bank 2 occurs when the central processing unit 3 or the data channel unit 5 requests a write-in operation relating to the address which has been transferred or is about to be transferred. The memory to memory transfer circuit 6 then functions to suspend the transfer operation with regard to the memory cycle and to renew the memory bank 2 with regard to the aforementioned address. The control circuit for performing this function is indicated simply by the broken line 7. FIG. 2 illustrates an example of the function involved when the utility component, which may comprise either the central processing unit 3 or the data channel unit 5, requests the transfer of data for writing into the memory bank 2. The following transfer operation is temporarily halted to renew the reserve bank 2 with regard to the desired address.

Upon completion of the aforedescribed process for the transfer of all the data stored in one of the memory banks to the $n^{th}$ memory bank 2, the memory to memory transfer circuit 6 produces an interruption signal and transfers said signal to the central processing unit 3. This advises the central processing unit 3 of the completion of the transfer of data. The central processing unit 3 temporarily halts the program then in execution and commences the execution of a memory bank transfer program. A memory bank transfer instruction is included in the memory bank transfer program. When the memory bank transfer instruction has been executed, the address assigned to the transferring memory bank is assigned to the standby memory bank 2. Upon the completion of these processes, the execution of the initial, interrupted program is resumed and the $n^{th}$ memory bank 2 is then utilized as the operating memory bank.

Figure 2C:
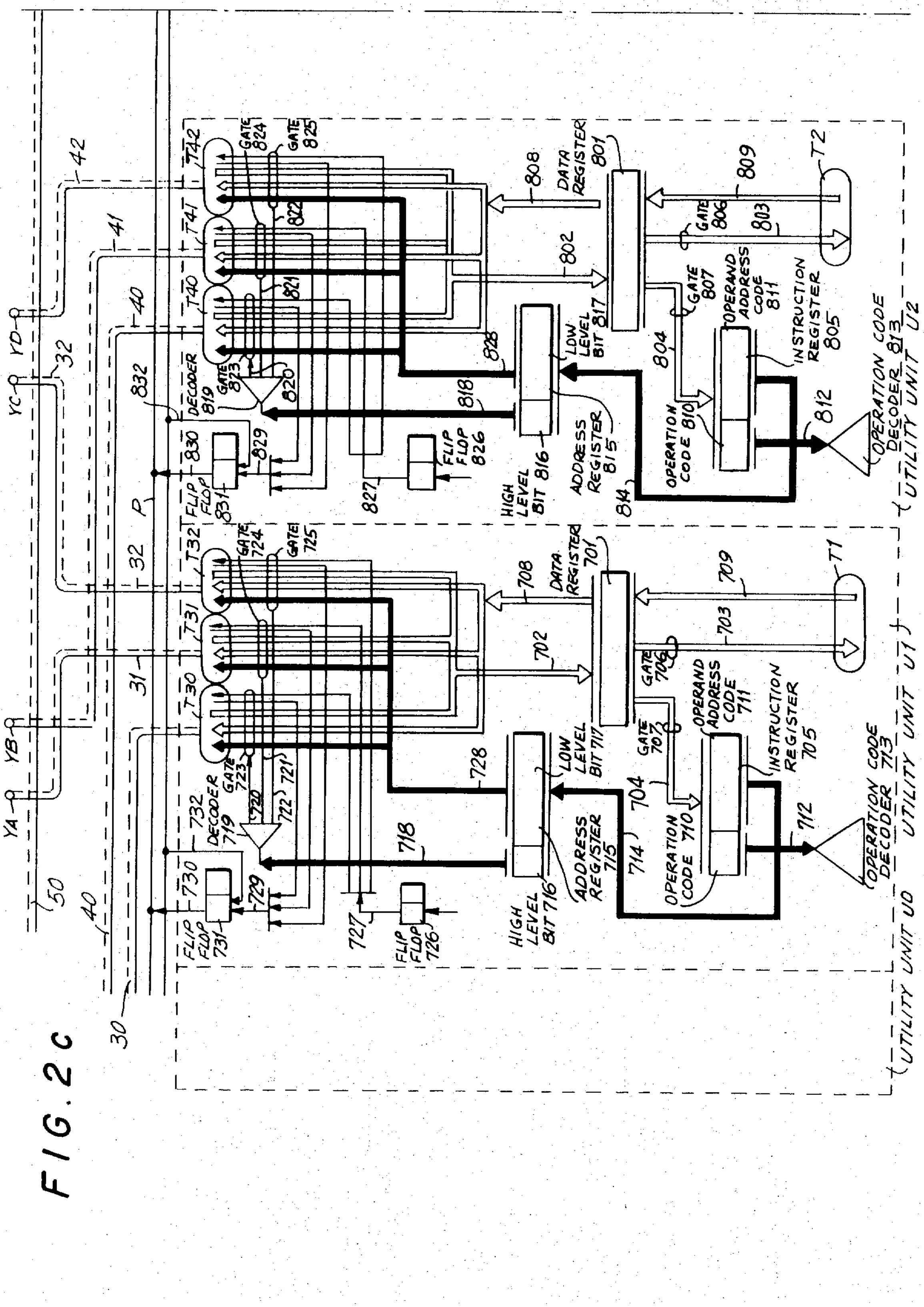

In FIGS. 2*a* and 2*b*, a plurality of memory banks B1, B2 and B3 are provided. FIGS. 2*a* and 2*b* also records a memory control unit M and auxiliary or utilizing components AS and WS. FIG. 2*c* comprises utility components U1 and U2 and FIG. 2d comprises an auxiliary or utility component MMC. The utility or auxiliary components AS, WS and MMC are the address switching circuit, the writing route switching circuit and the memory to memory transfer circuit (FIG. 1), respectively. The writing route switching circuit WS switches the leads for write-in of the data being transferred.

The utility units U1 and U2 may be the central processing unit 3 and the data channel unit 5, respectively, of FIG. 1. If both utility units U1 and U2 constitute the central processing unit 3, however, a terminal T1 or T2 of these units is connected to the accumulator of the computer circuit or calculator. If the utility units U1 and U2 constitute the data channel unit 5 (FIG. 1), one of the terminals T1 and T2 is connected to the buffer memory of the input-output unit. These connections are not shown in FIGS. 2*a* and 2*b*, 2*c* and 2*d*. In addition to the aforedescribed components, FIG. 2*a* includes a fourth memory bank B0 and FIG. 2*c* includes a third component or unit U0.

The memory control unit M of FIG. 2*a* includes two memory cycle assigning circuits S1 and S2 and two priority setting circuits P1 and P2. The memory cycle assigning circuit S1 includes a compression spring C1, which functions to pull a switch arm in a clockwise direction about its pivot point so that it contacts each of a plurality of contacts *s*1, *s*2, *s*3 and *s*4. The memory cycle assigning circuit S2 includes a compression spring C2, which functions to pull a switch arm in a clockwise direction about its pivot point so that it contacts each of a plurality of contacts *s*1, *s*2, *s*3 and *s*4.

The memory cycle assigning circuits S1 and S2 are not necessarily rotary switches including the illustrated springs, but may comprise, and are preferably, electronic logic circuits, well known in the art. The priority setting circuits P1 and P2 are selectively operated to assign a priority to the utility units U1 and U2 of FIG. 2*c*. That is, either of the utility units U1 and U2 is assigned priority over the other. There are various methods for setting the priority. Thus, for example, the utility unit may be manually switched from outside the circuit (not shown in the FIGS.). In the example illustrated in FIG. 2*c*, the utility unit U1 is set for priority over the utility unit U2. The utility unit U1, in the example of FIG. 2*c*, corresponds to the data channel unit 5 of FIG. 1 and the utility unit U2 corresponds to the central processing unit 3 of FIG. 1. The utility unit U0 may comprise a second data channel unit (not shown in the FIGS.).

The memory bank B1 of FIG. 2*a* includes a core array or matrix 101. The memory bank B2 of FIG. 2*a* includes a core array or matrix 201. The memory bank B3 of FIG. 2*b* includes a core array or matrix 301. Each of the core arrays or matrices is well known and is described in a textbook entitled "Introduction To Digital Computers" by Gerald A. Maley and Melvin F. Heilweil, 1968, Prentice-Hall Inc. The memory banks B1, B2 and B3 include registers 102, 202 and 302, respectively, each connected to the output of the corresponding one of the core matrices 101, 201 and 301. The register 102, 202 or 302 is described as the unit MBR and shown in FIG. 9 on page 157 of the aforedescribed textbook, and is identified as a sense register. The data read out from each of the core matrices 101, 201 and 301 is transferred to a corresponding one of the sense registers 102, 202 and 302 via a corresponding group of leads 103, 203 and 303.

Data thus transferred is again transferred from each of the sense registers 102, 202 and 302 to a corresponding one of error correcting circuits 105, 205 and 305 via a corresponding group of leads 104, 204 and 304. Each group of leads 103 and 104, 203 and 204, and 303 and 304 comprises a plurality of electrical conductors of the same number as the number of bits comprising a word in the memory.

The error correcting circuits 105, 205 and 305 automatically correct errors, when erroneous data is evident and detected. Each of the error correcting circuits 105, 205 and 305 may comprise that described in a textbook entitled "Error Correcting Codes" by W. W. Peterson, 1961, John Wiley & Sons, Inc. The data stored in a word comprises error correcting codes which are introduced into error detecting circuits 107, 207 and 307 of the memory banks B1, B2 and B3, respectively, via corresponding groups of leads 106, 206 and 306. Each of the sense registers 102, 202 and 302 is connected at its output to a corresponding one of the error detectors 107, 207 and 307. When the error detector 107, 207 or 307 detects an error, it produces a signal advising of such error and transfers said signal via a corresponding one of leads 108, 208 and 308. The error detection signals are transferred to the error correcting circuits 105, 205 and 305 which automatically correct the erroneous bit or data.

Each of the memory banks B1, B2 and B3 includes a corresponding one of inhibitors 109, 209 and 309. Each of the inhibitors 109, 209 and 309 may comprise that described on page 157 of the aforedescribed textbook entitled "Introduction To Digital Computers." Data in each of the core matrices 101, 201 and 301 is written into a corresponding one of the inhibitors 109, 209 and 309. As hereinbefore described, data read out from the core matrix 101 of the memory bank B1 is rewritten in said core matrix via the group of leads 103, the sense register 102, the group of leads 104, the error correcting circuit 105, a group of leads 110 and the inhibitor 109.

The utility units U1 and U2 of FIG. 2*c* also transfer the data to be written into the memory banks B1, B2 and B3. The data is transferred to the registers 102, 202 and 302 via corresponding groups of leads 111, 211 and 311. Thereafter, the data is written in via the register 102, the group of leads 104, the error correcting circuit 105, the group of leads 110 and the inhibitor 109, in the memory B1. It is understood, that the structure and operation of each of the memory banks B1, B2 and B3 is the same, so that a description of one applies to the others.

Each of gates 112, 212 and 312 is connected in a corresponding one of the groups of leads 103, 203 and 303. Each of gates 113, 213 and 313 is connected in a corresponding one of the groups of leads 111, 211 and 311. The gates 112, 212 and 312 are switched to their conductive condition and transfer data when data is read out from the core matrix 101, 201 and 301, respectively. The gates 113, 213 and 313 are switched to their conductive condition and transfer data to write in such data from the utility units U1 and U2. The data read by the matrices 101, 201 and 301 is transferred to the utility units U1 and U2. A group of leads 114 of the memory bank B1, a group of leads 214 of the memory bank B2 and a group of leads 314 of the memory bank B3 are utilized for the transfer of data to the utility units. The data transferred to the utility units is transferred via gates 115, 215 and 315, each of which is connected in a corresponding one of the groups of leads 114, 214 and 314. Each of the gates 115, 215 and 315 is switched to its conductive condition when the core matrix reads out the data.

Figure 2D:
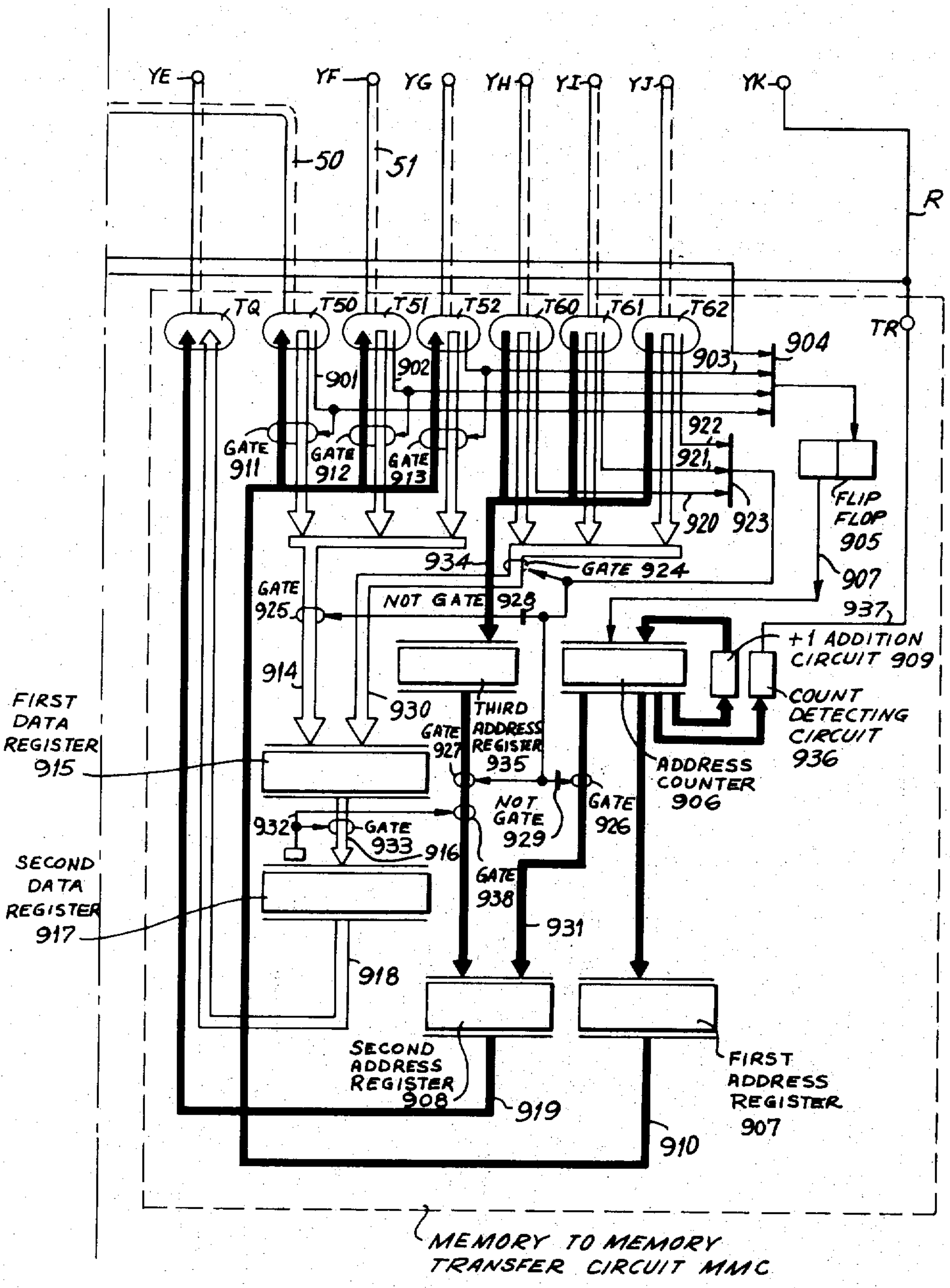

Only gates 116, 216 and 316 are switched to their conductive condition when the corresponding core matrix writes in the data. Each of the gates 116, 216 and 316 is connected in a corresponding one of the groups of leads 110, 210 and 310. Each of gates 117, 217 and 317 is connected in a corresponding one of the groups of leads 118, 218 and 318. Each of the gates 117, 217 and 318 is switched to its conductive condition when the memory to memory transfer circuit MMC of FIG. 2d is in operation and the corresponding core matrix 101, 201 or 301 is writing in the data. Data is transferred to the writing route switching circuit WS of FIG. 2*b* via the groups of leads 118, 218 and 318.

Various circuits of our data processing system select one address among the matrices 101, 201 and 301 of the individual memory banks B1, B2 and B3, respectively. The memory bank B1 includes an address selector 119 in operative proximity with the core matrix 101 and having an address register 120 at its output. The memory bank B2 includes an address selector 219 in operative proximity with the core matrix 201 and having an address register 220 at its output. The memory bank B3 includes an address selector 319 in operative proximity with the core matrix 301 and having an address register 320 at its output. Each of the address selectors 119, 219 and 319 may comprise that disclosed in, and described with reference to, FIG. 15 of the aforedescribed textbook entitled "Introduction To Digital Computers."

The address selectors 119, 219 and 319 function in accordance with the address data recorded in the address registers 120, 220 and 320. The address data in the address registers 120, 220 and 320 is set by groups of leads 121, 221, and 321, respectively. The groups of leads 121, 221 and 321 are indicated as thick solid lines. The only other thick solid lines in FIGS. 2*a* and 2*b* are those which transfer the address data. Since the address data comprises codes having several bits, each solid line represents a purality of electrical conductors.

The address data is transferred from the utility units U1 and U2 via the groups of leads 121, 221 and 321. Each of the memory banks B1, B2 and B3 includes a corresponding one of groups of leads 122, 222 and 322. The groups of leads 122, 222 and 322 conduct data when the memory to memory transfer circuit MMC of FIG. 2d is in operation and the corresponding memory bank commences to write in the data. The address data is transferred to the writing route switching circuit WS via the groups of leads 122, 222 and 322.

Each of the flip flops 123, 223 and 323 is included in a corresponding one of the memory banks B1, B2 and B3. The flip flops 123, 223 and 323 receive the command signal from the utility units U1 and U2 via leads 124, 224 and 324, respectively. The flip flops 123, 223 and 323 determine whether the corresponding memory bank B1, B2 and B3 should read out or write in the data in the succeeding cycle. This is determined by either utility unit U1 or U2. Leads 124, 224 and 324 from the outputs of flip flops 123, 223 and 323, respectively, conduct a logic signal 1 to write in data.

The output leads 124, 224 and 324 are each connected to one input of a corresponding one of AND gates 125, 225 and 325. The output of each of the AND gates 125, 225 and 325 is connected via a corresponding one of leads 126, 226 and 326 to a corresponding terminal T21, T22 and T23. The other input of each of the AND gates 125, 225 and 325 is connected to the corresponding one of the leads 108, 208 and 308. The memory bank correspondence output leads 126, 226 and 326 thus conduct a logic signal 1 when the error detectors 107, 207 and 307 detect an error, or when the flip flops 123, 223 and 323 are in writing condition. The output is transferred to the writing route switching circuit WS.

The memory banks B1, B2 and B3 include terminals T11, T12 and T13, respectively, which terminals are utilized to connect said memory banks to the other components. The terminal T11 of the memory bank B1 is connected by cable 11 to a terminal 401 of the address switching circuit AS of FIG. 2*a*. The terminal T12 of the memory bank B2 is connected by cable 12 to a terminal 402 of the address switching circuit AS. The terminal T13 is connected via a cable 13 to a terminal 403 of the address switching circuit AS. The terminal T21 of the memory bank B1 is connected by cable 21 to a terminal 502 of the writing route switching terminal WS of FIG. 2*b*. The terminal T22 is connected by a cable 22 to a terminal 502 of the writing route switching circuit WS. The terminal T23 of the memory bank B3 is connected by a cable 23 to a terminal 503 of the writing route switching circuit WS.

A terminal 400 of the address switching circuit AS of FIG. 2a is connected to a memory bank not shown in the FIGS. The terminal 401, 402 and 403, as hereinbefore described, are connected to the memory banks B1, B2 and B3, respectively. A terminal 410 is connected to the memory cycle control or assigning circuit of a memory control unit not shown in the FIGS. A terminal 411 is connected to the memory cycle control or assigning circuit S1 of the memory control unit M. A terminal 412 is connected to the memory cycle assigning or control circuit S2 of the memory control unit M. A terminal 413 is connected to memory transfer circuit MMC of FIG. 2*b*.

When the terminals 400 and 410, 401 and 411, and 402 and 412, for example, are connected during the normal operation of the data processing system of the invention, the memory bank B1 is connected to the memory cycle control circuit S1 of the memory control unit M and the memory bank B2 is connected to the memory cycle control circuit S2 of said memory control unit. The memory bank B3 is directly connected to memory to memory transfer circuit MMC. In this condition, the memory banks B1 and B2 are the transferring or line banks and the memory bank B3 is the standby or reserve bank. If an error occurs in the memory bank B1 under these conditions, the memory to memory transfer circuit MMC initiates operation and transfers all the data from said memory bank to the memory bank B3.

When all the transfer operations are completed, a control lead R conducts a logic signal 1 produced by the address switching circuit AS. The address switching circuit AS functions to change the existing connection. That is, the connection between the terminals 400 and 410 and the terminals 402 and 412 remains unchanged. The connection between the terminals 401 and 413, however, is changed so that said terminals are connected to each other and the terminals 403 and 411 are connected to each other. After such change, the memory bank B1 becomes the standby or reserve bank and the memory bank B3 becomes the transferring or line bank.

The writing route switching circuit WS also functions to switch over connections after receiving the signals from the control lead R. In the writing route switching circuit WS, the terminal 500 is connected to the terminal 510 and the terminal 502 is connected to the terminal 512. The terminal 503 is disconnected. The terminal 501 is disconnected by the logic signal 1 of the control lead R. The terminal 503 is connected to the terminal 511. The terminals 510, 511 and 512 of the writing route switching circuit WS are connected to the corresponding terminals of the memory to memory transfer circuit MMC of FIG. 2b.

The memory control unit or circuit M includes the memory cycle control or assigning circuits S1 and S2, or a plurality Sn of such circuits. The memory cycle control circuits Sn assign the memory cycle. The priority setting circuits P1 and P2 are included in the memory control unit M. A plurality of priority setting circuits Pn may be utilized. As hereinbefore discussed, the priority is set in the order *s*1, *s*2, *s*3 and *s*4. The only circuits of the memory control unit M which are described are those which change the priority. Such circuits are the priority setting circuits P1 and P2.

In the memory control unit M a terminal 600 is connected to a terminal 610, a terminal 601 is connected to a terminal 611, a terminal 602 is connected to a terminal 612, a terminal 630 is connected to a terminal 640, a terminal 631 is connected to a terminal 641 and a terminal 632 is connected to a terminal 642. The priority is determined in accordance with the order of the utility units U0, U1 and U2, as well as the memory to memory transfer circuit MMC. It is possible to utilize another priority setting circuit P1. In such a case, the priority will defer from the aforedescribed priority. This is also true for the priority setting circuit P2. The switchover may be accomplished manually or by a command which is predetermined by the utility unit.

The memory to memory transfer circuit MMC of FIG. 2*b* is not included in the priority circuits P1 and P2, but is always directly connected to the terminal s4 of the memory cycle control circuit Sn of the memory control unit M. Thus, the memory to memory transfer circuit MMC is always set at the lowest priority. The unit with the highest priority is therefore the utility unit U0 (not shown in the FIGS.). The utility unit U0 is connected to its associated terminals (not shown in the FIGS.) in the priority setting circuit P1 via a cable 70, and to the priority setting circuit P2 via a cable 80.

A terminal T31 of the utility unit U1, which is second in priority, is connected to the terminal 611 of the priority setting circuit P1 via a cable 31. A terminal T32 of the utility unit U1 is connected to the terminal 641 of the priority setting circuit P2 via a cable 32. A terminal T41 of the utility unit U2 is connected to the terminal 612 of the priority setting circuity P1 via a cable 41. A terminal T42 of the utility unit U2 is connected to the terminal 642 of the priority setting circuit P2 via a cable 42. A terminal T30 of the utility unit U1 is connected via a cable 30 to a corresponding terminal of a corresponding priority setting circuit (not shown in the FIGS.) of the memory control unit M. A terminal T40 of the utility unit U2 is connected via a cable 40 to a corresponding terminal of a corresponding priority setting circuit (not shown in the FIGS.) of the memory control unit M.

The utility unit U1 includes a data register 701 and the utility unit U2 includes a data register 801. The data register 701 is connected between the sensing register 102 of the memory bank B1 and the accumulator of the opertion circuit or buffer memory of the input-output (not shown in the FIGS.) and functions to transfer data. The data register 801 of the utility unit U2 is connected between the sensing register 202 of the memory bank B2 and the accumulator. The data read from the sensing register in the memory bank is thus recorded by the data register 701 via a group of leads 702, or by the data register 801 via a group of leads 802.

The data stored by the data registers 701 and 801 is transferred to the sensing registers 102, 202 and 302 of the memory banks B1, B2 and B3 via a group of leads 708 and a group of leads 808. The data stored by the data registers 701 and 801 is transferred to terminals T1 and T2, respectively, via groups of leads 703 and 803. Furthermore, the data from the terminals T1 and T2 is stored by the data registers 701 and 801 via groups of leads 709 and 809, respectively.

The data stored in the data registers 701 and 801 is transferred via the groups of leads 703 and 803 to the accumulator or buffer register (not shown in the FIGS.). The data stored in the data registers 701 and 801 is transferred through the groups of leads 704 and 804 to registers 705 and 805, respectively, of the utility units U1 and U2, respectively. Each of the registers 705 and 805 is an instruction register. A gate 706 is connected in the group of leads 703 and a gate 806 is connected in the group of leads 803. A gate 707 is connected in the group of leads 704 and a gate 807 is connected in the group of leads 804. When the utility unit is in the operand fetch cycle, the gate 706 or 806 of said utility unit is in its conductive condition. When the utility unit is in the instruction fetch cycle, the gate 707 or 807 of said utility unit is in its conductive condition. The operand fetch cycle and the instruction fetch cycle ococur alternately in the utility unit. During the instruction fetch cycle, the contents of the data register 701 are stored in the instuction register 705 and the contents of the data register 801 are stored in the instruction register 805.

The instruction register 705 comprises a register part 710 for the operation code and a register part 711 for the operand address code. The instruction register 805 comprises a register part 810 for the operation code and a register part 811 for the operand address code. The operation code is supplied to an operation code decoder 713 via a group of leads 712 from the operation code part 710 of the instruction register 705. The operation code is supplied to an operation code decoder 813 via a group of leads 812 from the operation code part 810 of the instruction register 805. Each of the operation code decoders 713 and 813 provides the data arithmetic calculations or processes the input-output data in accordance with the operation code.

The data to be processed is written into or read-out from the addresses of the selected memory matrix via data registers 701 and 801 or via one of the sensing registers 102, 202 and 302 of the memory banks B1, B2 and B3. The selection of the memory matrix or the addresses within the memory matrix is made in accordance with the contents of the operand address code parts 711 and 811 of the instruction registers 705 and 805, respectively, of the utility units U1 and U2. That is, the contents of the operand address code parts 711 and 811 are transferred to the separate address registers 715 and 815 of the utility units U1 and U2. The address register 715 has a high level bit part 716 and a low level bit part 717. The address register 815 has a high level bit part 816 and a low level bit part 817.

The contents of the high level bit parts 716 and 816 of the address registers 715 and 815, respectively, selected from among the plurality of memory banks, and transferred to decoders 719 and 819 via groups of leads 718 and 818, respectively. The transferred high level bit code is decoded by the decoder 719 in the utility unit U1 and one of a plurality of output leads 720, 721 and 722 is selected. The transferred high level bit code in the utility unit U2 is decoded by the decoder 819 and one of output leads 820, 821 and 822 is selected. The selected lead in the output of the decoder 719 or 819 provides a logical signal and supplies such signal to a corresponding one of gates 723, 724, 725, 823, 824 and 825. One of the memory banks is then selected.

The address selection within the selected memory bank is made in accordance with the contents of the low level bits in the low level bit part 717 of the address register 715. All the low level bits are transferred to the address register 120 of the memory bank B1 due to the selective action of the address decoders 719 and 819 via the corresponding gate, which gate is then in conductive condition, and which gate is one of the gates 723, 724, 725, 823, 824 and 825. In the example of FIGS. 2*a* and 2*b*, the selection is made so that both utility units U1 and U2 may utilize the memory bank B1 simultaneously. Therefore only the utility unit U1 is permitted to operate, due to its higher priority. If the higher priority utility unit UO does not require the use of the memory bank B1, the memory cycle control circuit S1 of the memory control unit M remains as shown in FIG. 2*a*. In these conditions, the gate 724 of the utility unit U1 is in its conductive condition, so that it is possible to write-in or read-out the selected address position of the matrix 101 of the memory bank B1.

When there is write-in of data, the contents of the data register 701 are transferred to the sensing register 102 of the memory bank B1 via the group of contacts 708, the terminal T31, the cable 31, the terminals 611 and 602, the contact s3, the terminals 411 and 401, and the terminal T11. The data is then written into the matrix 101. When there is read-out of the data, such data is read-out from the matrix 101 to the sensing register 102. After passing through the error correcting circuit 105 and the gate 115, the data is supplied from the terminal T11 to the corresponding terminal T31 of the utility unit U1 in providing the reverse of the write-in, as hereinbefore described. The data is finally stored in the data register 701 via the group of leads 702.

A flip flop 726 of the utility unit U1 and a flip flop 826 of the utility unit U2 are set, or ON, when there is write-in of data. The flip flop 726 has an output lead 727 and the flip flop 826 has an output lead 827. The leads 727 and 827 supply a logical signal 1 which switches the flip flop 123 of the memory bank B1 to its set or ON condition. The logical signal 1 supplied by the leads 727 and 827 from the flip flops 726 and 826 is transferred by the gates 723, 724, 725, 823, 824 and 825. Therefore, as previously described, only the memory bank flip flops selected by the address decoders 719 and 819 remain in their set or ON condition.

Each utility unit Un is advised of the occurrence of an error in the memory bank Bn by the error detector 107, the lead 108 and the terminal T11. In other words, leads 729 and 829 to the inputs of flip flops 731 and 831, respectively, of the utility units U1 and U2 indicate the occurrence of an error and, thereby, an interrupted program. As a result, each utility unit Un is set to start a program which is interrupted. The reset condition of the flip flops 731 and 831 of the utility units U1 and U2, respectively, is immediately indicated via leads 730 and 830, respectively, from the outputs of said flip flops, respectively, to the memory to memory transfer circuit MMC. This is accomplished via a cable P. When the operation of the memory to memory transfer circuit MMC is completed, the utility units U1 and U2 are set to the interrupt condition. In other words, the utility units U1 and U2 are supplied with operation completion signals via leads 732 and 832, respectively, thereby switching the interruption flip flops 731 and 831 to their set condition.

The memory to memory transfer circuit MMC transfers all the data in the memory bank which creates errors to the standby memory bank or banks. The memory to memory transfer circuit MMC insures that the erroneous data in the initial or transferring memory bank is transferred to the equivalent address in the standby memory bank. Thus, for example, the data at the address 100 in the initial memory bank must be written in at the address 100 in the standby memory bank. It is possible for the utility unit U1 or U2 to write-in to a memory bank which is simultaneously transferring erroneous data, under the control of the memory to memory transfer circuit MMC, to the standby memory bank.

In the examples of FIGS. 2*a*, 2*b*, 2*c* and 2*d*, the memory bank B3 is a standby memory bank. It is assumed that the memory bank in which an error occurs is the memory bank B1 of FIG. 2*a*. The error occurring in the memory bank B1 is detected by the error detector 107 thereof. The error detector 107 produces an error signal which is transferred to either the utility unit U1 or the utility unit U2. In the present example, the utility unit U1 corresponds to the contact point *s*2. The error signal is transferred via the contact points which are then closed, the lead 108, the terminal T11, the cable 11, the terminals 401 and 411 and the memory cycle control switches S1. The error signal supplied to the utility unit U1 switches the flip flop 731 to its set condition for the interruption program and places said utility unit in the interrupt condition. The aforementioned condition is conveyed by the lead 730 from the flip flop 731 to the common signal line or cable P.

The error signal supplied to the memory to memory transfer circuit MMC via the lead P is supplied to a flip flop 905 via an OR gate 904. The error signal switches the flip flop 905 to its set condition. The memory to memory transfer circuit MMC is actuated by the flip flop 905 when said flip flop is set. The memory to memory transfer circuit MMC is actuated by advancing an address counter 906. More specifically, a logical signal 1 in an output lead 907 of the flip flop 905 actuates the advancing operation just as the signal resets the contents of the address counter 906, or when a numerical value of 0000 appears. The contents of the address counter 906 are transferred to address registers 907 and 908. After the transfer, it is possible to advance the contents of the address counter 906 by one digit. The one digit advance is accomplished by a +1 addition unit 909.

The address data transferred to the address register 907 is transferred to the address data register of the memory bank in which an error occurs, via a group of leads 910. In the example of FIGS. 2*a* and 2*b*, a gate 912 is switched to its conductive condition by a logical signal 1 in a lead 902. The contents of the address register 907 are transferred via the terminal T51. In other words, the transferred address data is stored in the address register 120 of the memory bank B1 via a cable 51, the contact s4 of the memory cycle control circuit S1, the terminals 411 and 401, the cable 11, the terminal T11 and the group of leads 121.

The specified address of the matrix 101 of the memory bank B1 is selected to read-out the data stored therein. The read-out data is supplied to the memory to memory transfer circuit MMC in a process which is the reverse of write-in. The gate 912 is in its conductive condition and the data is transferred to a first data register 915 via the terminal T51 and a group of leads 914. The input data is supplied to a second data register 917 via a plurality of leads 916 from the first data register 915. The data read-in to the data register 917 is supplied to a terminal TQ, via a group of leads 918, from where it is transferred to the standby memory bank B3. The address data stored in the second address register 917 is simultaneously transferred from the terminal TQ, via a group of leads 919 and a cable Q, to the memory bank B3 for standby use.

The cable Q is connected to the terminal 413 of the address switching circuit AS. The output data and the address data are therefore transferred to the memory bank B3 via the cable 13. The output address data is transferred to the address register 320 of the memory bank B3 via a plurality of leads 321. The address of the matrix 301 of the memory bank B3 is thereby selected. The transferred data is also supplied via the plurality of leads 311 to the sensing or memory register 302 and is then writtein in to the selected address location in the matrix 301 via the error correcting circuit 305 and the inhibitor 309 of the memory bank B3.

The data stored in one of the address locations of the memory bank B1 is thus written into one of the address locations of the memory bank B3 via the first and second data registers 915 and 917 of the memory to memory transfer circuit MMC. The selection of any one address location is entirely dependent upon the contents of the address counter 906. In other words, the selection is first made with reference to the address location 0000, then with reference to the address location 0001, and so on, until it is finally made with reference to the address location 9999. If the matrix of the memory bank includes addresses 0000 to 9999, the selection of the address location is made as hereinbefore described. In this example, the address counter 906 of the memory to memory transfer circuit MMC comprises a four digital decimal counter. All the data in the memory bank B1 is therefore transferred to the memory bank B3.

IT is assumed that the utility unit is required to write-in to the transferring memory bank. It is therefore assumed that the flip flop 726 of the utility unit U1 is in its set condition, that the outputs lead of said flip flop conducts a logical signal 1, and that, consequently, the write-in signal has been transferred to the flip flop 123 of the memory bank B1. At such time, the group of leads 124 of the memory bank B1 conducts a logical signal 1. Since a lead 108, which indicates an error, also conducts a logical signal 1, the AND gate 125 is switched to its conductive condition and its output lead 126 conducts a logical signal 1.

The logical signal 1 conducted by the output lead 126 of the AND gate 125 of the memory bank B1 is immedidately transferred to the memory to memory transfer circuit MMC via the terminal T21 and the writing route switching circuit WS. In the example of FIGS. 2*a*, 2*b*, 2*c* and 2*d*, the signal is supplied to the memory to memory transfer circuit MMC via a terminal T61. In other words, a lead 921 conducts the logical signal 1 and such signal is transferred to each of gates 924, 925, 926 and 927 via an OR gate 923. The gates 924 and 927 are switched to their conductive condition and the gates 925 and 926 are switched to their non-conductive condition. This is due to the fact that a NOT gate 928 is connected in the lead to the gate 925 and a NOT gate 929 is connected in the lead to the gate 926.

The group of leads 914 was previously conducting and the group of leads 930 was previously non-conducting. A group of leads 931 was previously conducting and a lead 932 was previously non-conducting. When the signal, supplied in the lead 921, is received, the lead 932 becomes conductive and the group of leads 931 becomes non-conductive. At such instant, the data transferred to the sensing or memory register 102 of the memory bank B1 is written into the matrix 101 of said memory bank via the inhibitor 109. The data is simultaneously transmitted from the terminal T21 of the memory bank B1 to the terminal T61 of the memory to memory transfer circuit MMC, and is transferred to the first data register 915 of said memory to memory transfer circuit via the group of leads 930. If the preceding data in the second data register 917 has already been transferred to the standby memory bank B3, the data in the first data register 915 is transferred to said second data register. This is controlled by the lead 932 and a gate 933.

The address data is simultaneously transferred with the write-in data from the memory bank B1. That is, the address data is transferred via the groups of leads 122, the terminal T21, the cable 21, the terminal 501, the terminal 511, the cable 61 and the terminal T61 of the memory to memory transfer circuit MMC. The memory to memory transfer circuit MMC includes a third address register 935. The transfer data is supplied to the third address register 935 via a plurality of leads 934. The leads then conduct a logical signal 1, so that the gate 927 is switched to its conductive condition. The supplied address data is therefore transferred from the third address register 935 to the second address register 908 via the gates 927 and 938.

Data in the third address register 935 is transfered to the second address register 908 when the contents of the first data register 915 is transferred to the second data register 917 due to the gates 933 and 938 being in their conductive condition. Since the groups of leads 918 and 919 are simultaneously conducting, the data stored in the second data register 917 and the address data stored in the second address register 908 are simultaneously transferred to the memory bank B3 via the terminal TQ, the cable Q, the terminals 413 and 403, the terminals 413 and 403, the cable 13 and the terminal T13. The write-in of data in the memory bank B3 is in accordance with the address data.

When the address counter 906 reaches the last figure 9999, a count detecting circuit 936 detects such figure and transfers the data to a lead 937. The lead 937 thus conducts a logical signal 1 and supplies said signal to the address switching circuit AS and to the writing route switching circuit WS via a terminal TR and a lead R. The logical signal 1 causes the address switching circuit AS and the writing route switching circuit WS to operate. That is, the system is then connected so that the memory bank B1 is the standby memory bank and the memory bank B3 is the transferring or line memory bank. The two utility units U1 and U2 are simultaneously supplied with the interruption signal from the lead R via leads 732 and 832, respectively, and are thereby conditioned for interruptions.

The operation of the data processing system of our invention is explained with reference to FIG. 3. FIG. 3 illustrates the memory cycles. In order to simplify the explanation, it is assumed that the utility unit U1 is the data channel unit 5 of FIG. 1, that the utility unit U2 is the central processing unit 3 of FIG. 1, and that the memory bank in which an error occurs is the memory bank B1. Henceforth, all the outgoing data provided at the terminals T30, T31, T32, T40, T41, T42, and so on, are identified as access request signals, and all the incoming data provided at said terminals are identified as interruption signals.

The access request signals from the utility unit U1 contain the address data provided in the low level bit part 717 of the address register 715, the control signals provided in the output lead 727 of the flip flop 726 for the read-out or write-in of memory data and the write-in data from the data register 701 provided in the group of leads 708 for the write-in condition. Each memory bank B1, B2 and B3 includes an address register 120, 220 and 320, respectively, and a sensing or memory register 102, 202 and 302, respectively. In each memory bank, both the address register and the memory may independently accomplish the read-out and write-in. The memory bank which is assigned to read-out and write-in reads out the data from the designated addresses or writes in the data at said designated addresses. In the read-out operation, the read-out data is transferred via the memory control unit 4 to a utility unit U$n$, which may be the central processing unit 3, the data channel unit 5 or the memory to memory transfer circuit 6 of FIG. 1.

The memory data comprises codes for providing single error correction and doble error correction. The data checking and correction is provided by the error detector 107, 207 and 307 corresponding to each of the memory banks B1, B2 and B3, and the error correcting circuit 105, 205 and 305, corresponding to each of said memory banks. If a single error is detected in the data from the memory bank B1, upon detection of such error, the utility unit U1 is interrupted via the lead 729 to the input of the flip flop 731. Since it is a single error, the data is corrected and the operation may be continued. The utility unit U1 investigates the erroneous memory bank. The standby bank, after transferring command signals for transferring the memory bank to the memory to memory transfer circuit MMC, returns to the program in effect prior to the error.

When a single error is detected, the memory bank B1 monitors the contents to be rewritten via the flip flop 123 and the AND gate 125. If there is any data to be rewritten, the memory bank B1 transfers the address and data to be written to the memory to memory transfer circuit MMC via the terminal T21.

When the memory to memory transfer circuit MMC receives a command signal to transfer data from the utility unit U1 via the lead 730 from the output of the flip flop 731, the flip flop 905 of said memory to memory transfer circuit MMC is switched to its set condition and all the data in the memory bank B1 is transmitted to B3. The access to each memory bank is illustrated, for this example, in FIG. 3. When the command signal transferred via the output lead 730 from the utility unit 1 is received by the memory to memory transfer circuit MMC, the address counter 906 of said memory to memory transfer circuit is set to the memory bank initial address 0000 and requests the memory bank B1 initial address 0000 via the first address register 907 for read-out. Since the address counter 906 does not include address bits to specify the different banks, as do the address registers 715 and 815 of the utility units U1 and U2, respectively, the gates 911, 912 and 913 of the memory to memory transfer circuit MMC are utilized to specify the different memory banks.

When a read-out request signal is received by the memory to memory transfer circuit MMC and data is read-out from the memory bank B1, the address counter 906 of said memory to memory transfer circuit is reset by the +1 addition circuit 909. The data is simultaneously transferred to the second data register 917 via the gates 924 and 925 and the first data register 915. The first data register 915 is a buffer register for the second data register 917. Request signals for access to the memory bank are then made to the memory banks B1 and B3 via the terminals T51 and TQ, respectively, of the memory to memory transfer circuit MMC. In other words, the address counter 906 requests the address 0 in the memory bank B3 for write-in via the second address register 908. The address counter 906 of the memory to memory transfer circuit MMC simultaneously requests the address 1 in the memory bank B1 for read-out via the first address register 907. The standby memory bank B3 may always accept the request signal for the memory to memory transfer circuit MMC, since the other utility units do not request said standby memory bank.

If there are no requests from the other utility units to utilize the memory bank B1, the memory to memory transfer circuit MMC, which has the lowest priority, has access to said memory bank. The data read-out via the contact s4 is first stored in the first data register 915 and is then transferred to the second data register 917 when said second register becomes available. When access to the memory bank B1 is received, the address in the address counter 906 is increased by 1. The following transfers are similar to the previous transfer. However, when the utility unit U0, U1 or U2 rewrites the contents in the memory bank B1, identical data should be written into the memory bank B3.

In FIG. 3, the memory to memory transfer circuit MMC, in the memory cycle 1, reads out the address at number $n$ in the memory bank B- and writes in at the address number $n-1$ in the memory bank B3. In the memory cycle 2, the memory to memory transfer circuit MMC writes the data into the memory bank B1 at address number $n$ in the memory bank B3. If the central processing unit 3, which is the utility unit U2, has access to the memory, however, the memory to memory transfer circuit MMC cannot obtain access to the memory bank B1. In this condition, the memory to memory transfer circuit memory remains inoperative until access is obtained to address number $n+1$ in the memory bank B1.

In the memory cycle 3, the memory to memory transfer circuit MMC remains inoperative, since the data channel unit 5, or the utility unit U1, has transferred a request signal for write-in at the address number $m$ in the memory bank B1. The memory to memory transfer circuit MMC is then advised, via the lead 921 thereof, of the request signal to write-in at the memory bank address number 1. The data is then transferred to the first data register 915 via the gate 924, and is then transferred to the second data register 917. The address data $m$ is transferred to the third address register 935. In the memory cycle 4, the memory to memory transfer circuit MMC reads out the address number $n+1$ in the memory bank B1 and simultaneously writes in to the second data register 917, the data at address number $m$ in the memory bank B3 via the second address register 908 and the group of leads 919, in accordance with the contents of the third address register 935.

Similar transfers of memory data are then continued. When the contents of the address counter 906 have reached the maximum or highest memory bank address 9999, and the transfer of the final address is completed, the memory control unit M is interlocked, and all the addresses for the memory bank B1 are assigned to the memory bank B3. The memory bank B1 is then separated from the circuit. When such operation is completed, the interlock of the memory control unit M is released. The central processing unit 3 and the data channel unit 5 then transfer data to the memory bank B3. When the transfer of data is completed, the central processing unit 3 is maintained in condition by the input leads 732 and 832, respectively, of the flip flop 731 and 831, respectively, of the utility units U1 and U2. The memory banks may be transferred without decreasing the processing capacity of the program being executed or changing the address of the program being executed. Appropriate steps for correction of the error or fault are then taken for the separated memory bank.

In the foregoing discussion, when a single error has occurred in the memory bank, its detection, commencing with the interruption of the central processing unit 3, is described. However, even under normal conditions in which no error is detected, memory banks may be transferred in accordance with the program. Furthermore, when a single error is detected, memory banks may be transferred directly via the address switching circuit AS without interruption of the program.

In the previous discussion, the occurrence of a single error in the memory bank is indicated. That is, the memory to memory transfer circuit MMC is activated by an interruption in the process. However, when a single error which has occurred in the memory bank is detected by circuitry which automatically activates or actuates the memory to memory transfer circuit MMC, the transfer from line to standby may be provided without a program. Furthermore, in the previous indication, the transfer from line to standby utilizes an example of erroneous data to provide the transfer. The data processing system of our invention provides the transfer of memory banks for reasons other than erroneous data. Thus, for example, memory banks may be transferred although there is no error or fault. The data processing system of our invention permits the transfer of memory banks and provides a tremendous improvement in the availability of such memory banks.

While the invention has been described by means of specific examples and in a specific embodiment, we do not wish to be limited thereto, for obvious modifications will occur to those skilled in the art without departing from the spirit and scope of the invention.

We claim:

1. A system for transferring information between a plurality of memory banks, comprising a plurality of memory banks, each of said memory banks having the same performance and capacity, at least one of said memory banks being an operating memory bank while at least one other of said memory banks serves as a standby memory bank, processing means addressing to said operating memory bank for reading information, said processing means including a central processing unit and a data channel unit, a memory control means controlling the transfer of information according to the requirements of address received by said processing means or memory to memory transfer circuit means, said memory control means including a priority setting circuit operable to give permission of said addressing to said processing means rather than said memory to memory transfer circuit means if requirement by processing means and requirement by memory to memory transfer circuit means occur at the same time, said processing means continuing the processing during transferring information in said operating memory bank to said standby memory bank and said memory to memory transfer circuit means connected to transfer the information from said operating memory bank to said standby memory bank, said memory to memory transfer circuit being operable to write the information into the address of a standby memory bank which corresponds to the address of an operating memory bank in which said processing means writes the information during the switching of memory banks, said standby memory bank then becoming the operating memory bank.

2. A system according to claim 1, wherein said information has error check and correct code information, and system includes memory correction means for correcting a single error in transferred information.

3. A system according to claim 2, including means to detect a single error in said transferred information, said error being correctable in each of said memory banks, said memory to memory transfer circuit including means being operable to transfer corrected information from said operating memory bank to said standby memory bank upon detection of a single error in information stored in said operating memory bank.

4. A system according to claim 3, including address switching circuit means, and writing route switching circuit means, said address switching circuit means having means for causing said initial operating memory bank to become the standby memory bank and said initial standby memory bank to become the operating memory bank.

* * * * *